(12) United States Patent  
Chuang et al.

(10) Patent No.: US 8,861,186 B2
(45) Date of Patent: Oct. 14, 2014

(54) POWER SUPPLY APPARATUS AND MODULAR POWER CONNECTING METHOD THEREOF

(75) Inventors: Shih-Chang Chuang, Taoyuan Hsien (TW); Yu-Hung Huang, Taoyuan Hsien (TW); Hsin-Chung Niu, Taoyuan Hsien (TW); Wang-Lung Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 223 days.

(21) Appl. No.: 13/523,408

(22) Filed: Jun. 14, 2012

(65) Prior Publication Data

US 2013/0314865 A1 Nov. 28, 2013

(30) Foreign Application Priority Data

May 22, 2012 (TW) .............................. 101118084 A

(51) Int. Cl.
*G06F 1/16* (2006.01)
(52) U.S. Cl.
USPC ................. 361/679.01; 312/319.2; 248/311.2; 345/179
(58) Field of Classification Search
USPC ........ 312/263, 334.1, 323, 293.1, 237, 319.2, 312/231.1, 245, 265.6; 361/788, 679.01, 361/679.08, 679.09, 679.17, 679.21, 361/679.22, 679.23, 679.24, 679.25, 361/679.27, 679.02, 679.33, 679.48; 248/351, 70, 206.5, 301, 541, 311.2; 345/698, 102, 600, 660, 211, 99, 100, 345/690, 179, 169, 212; 455/41.1, 520, 455/558, 212, 150.1, 67.13, 420, 419, 557
See application file for complete search history.

(56) References Cited

U.S. PATENT DOCUMENTS

| 6,428,126 | B1 * | 8/2002 | Poulter et al. ................. 312/263 |
| 6,542,997 | B1 | 4/2003 | Rolls et al. |
| 7,848,115 | B2 * | 12/2010 | Casto et al. ................... 361/788 |
| 2002/0138779 | A1 | 9/2002 | Emberty et al. |
| 2003/0058613 | A1 | 3/2003 | Varghese et al. |

* cited by examiner

Primary Examiner — Hung Duong
(74) Attorney, Agent, or Firm — Kirton McConkie; Evan R. Witt

(57) ABSTRACT

A power supply apparatus includes a first electronic device, a second electronic device, and plural power modules. The first electronic device includes a first compartment. The first compartment has a first width. The second electronic device includes a second compartment. The second compartment has a second width. Each of the power modules has a third width. The third width is determined according to the first width and the second width, so that a specified number of power modules are selectively accommodated within the first compartment or the second compartment.

19 Claims, 10 Drawing Sheets

POWER SUPPLY APPARATUS AND MODULAR POWER CONNECTING METHOD THEREOF

FIELD OF THE INVENTION

The present invention relates to a power supply apparatus, and more particularly to a power supply apparatus with a universal and hot-swappable power module. The present invention relates to a modular power connecting method of the power supply apparatus.

BACKGROUND OF THE INVENTION

Recently, with increasing development of industrial technologies and science, the human lives are closely correlated with electronic products. For example, in the computer, network, telecommunication, medical and automation industries, a large number of electronic equipments are employed to enhance the living quality and medical standards of the modern people. Consequently, various power supply apparatuses are designed to comply with many applications and provide electric energy for various electronic equipments.

Recently, the general trends in designing electronic products are toward small size, light weightiness, environmental protection and power-saving efficacy. Consequently, the power supply apparatuses for various electronic equipments are designed to have high power density and high power efficiency. Nowadays, for designing associated products, the industry has developed a traditional power supply standard to cover the power supply specifications, the power distribution system specifications, the rack cabinet specifications and the cooling system specifications.

In the conventional power supply standard, the power supply specifications are determined by the designers, but no united definitions and criteria are made. Moreover, since various power supply units and the whole electronic equipment are restricted by the size of the established space, it is necessary to customize the power supply units. That is, the specifications and sizes of the power supply units should be re-planned according to the established space. Consequently, the products of the power supply units in the market have diversified sizes. The process of re-designing the power supply units may increase time and cost about research, tooling and production. As known, the whole set of hard tooling is very expensive. Moreover, the product supply and the inventory management are suffered from burden and distress.

Therefore, there is a need of providing a power supply apparatus and a power connecting method in order to eliminate the problems encountered from the prior art.

SUMMARY OF THE INVENTION

A first object of the present invention provides a power supply apparatus and a power connecting method in order to eliminate the problems that the power supply units in the market have diversified sizes and the specifications and sizes of the power supply units should be re-planned according to the established space. The inventive power supply apparatus and power connecting method can reduce the fabricating time and cost and minimize the burden and distress of the product supply and the inventory management.

A second object of the present invention provides a power supply apparatus and a power connecting method in order to determine the form factor of the power module according to the sizes of various electronic devices by statistical analysis and induction methods. In such way, a maximum number of power modules may be installed in an identical electronic device or different electronic devices. Consequently, the space utilization will be enhanced, and the designing and fabricating cost will be reduced.

A third object of the present invention provides a power supply apparatus and a power connecting method in order to standardize the power modules and unify the size and the specification of the power modules according to the optimized form factor of the power module. Consequently, the product development cycle can be shortened and the power modules can be flexibly expanded and highly scalable.

In accordance with an aspect of the present invention, there is provided a power supply apparatus. The power supply apparatus includes a first electronic device, a second electronic device, and a plurality of power modules. The first electronic device includes a first compartment. The first compartment has a first width. The second electronic device includes a second compartment. The second compartment has a second width. Each of the power modules has a third width. The third width is determined according to the first width and the second width, so that a specified number of power modules are selectively accommodated within the first compartment or the second compartment.

In accordance with another aspect of the present invention, there is provided a modular power connecting method. Firstly, a first electronic device and a second electronic device are provided. The first electronic device includes a first compartment, and the second electronic device includes a second compartment. The first compartment has a first width, and the second compartment has a second width. Then, a plurality of power modules are provided, wherein each power module has a third width. The third width is determined according to the first width and the second width. Afterwards, a specified number of power modules may be selectively accommodated within the first compartment or the second compartment.

In accordance with a further aspect of the present invention, there is provided a power supply apparatus. The power supply apparatus includes an electronic device and at least one power module. The power module has a modularized width. The modularized width is determined according to the electronic device and other electronic devices, so that a specified number of power modules are permitted to be accommodated within the electronic device.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
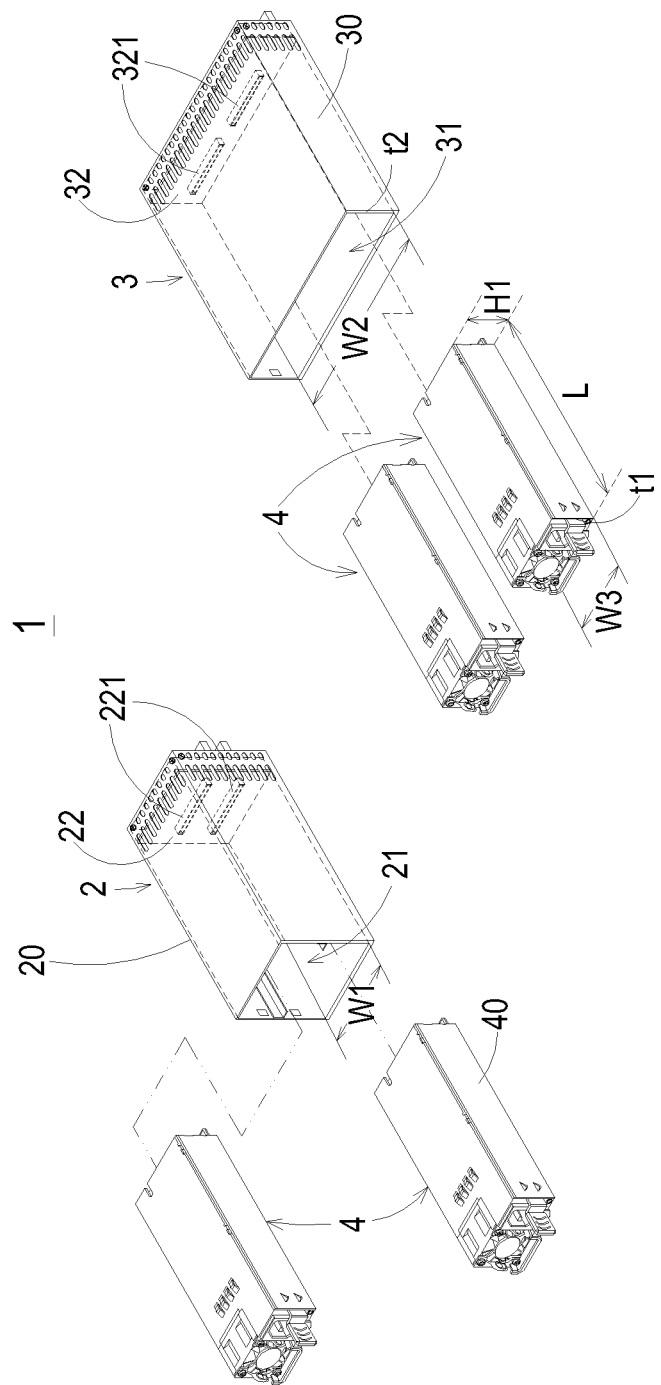
FIG. 1 is a schematic exploded view illustrating a power supply apparatus according to an embodiment of the present invention.

FIG. 1 is a schematic exploded view illustrating a power supply apparatus according to an embodiment of the present invention. The power supply apparatus 1 may be included in a data processing system, an industrial computer system, a network communication system, an electronic telecommunication system, a medical system or an engineering control system. As shown in FIG. 1, the power supply apparatus 1 at least comprises a first electronic device 2 or a second electronic device 3 and a plurality of power modules 4. Each of the first electronic device 2 and the second electronic device 3 is installed in a desktop personal computer, a large-scale supercomputer, a data processing system, a network server, a data storage system, a router, a network switch, or the like. Alternatively, each of the first electronic device 2 and the second electronic device 3 may be installed in a rack cabinet.

Please refer to FIG. 1 again. The first electronic device 2 has a first compartment 21. The second electronic device 3 has a second compartment 31. In some embodiments, the first compartment 21 has a first width W1, and the second compartment 31 has a second width W2. An example of the power module 4 includes but is not limited to a power supply unit. Each of the power modules 4 has a third width W3 and a first height H1. The third width W3 is an optimal width predetermined according to the first width W1 and the second width W2. Consequently, a specified number of power modules 4 are selectively accommodated within the first compartment 21 or the second compartment 31.

Preferably, the first electronic device 2 has a first chassis 20 having the first compartment 21 for accommodating a specified number of the power modules 4. Alternatively, the first electronic device 2 may be an electronic device without a physical chassis. Preferably, the second electronic device 3 has a second chassis 30 having the second compartment 31 for accommodating a specified number of the power modules 4. Alternatively, the second electronic device 3 may be an electronic device without a physical chassis. In an embodiment, each power module 4 has a case 40 having the third width W3, a first height H1 and a length L. The third width W3 of the case 40 is a standardized width across a plurality of different electronic devices so that a specified number of power modules 4 are permitted to be accommodated within one of the electronic devices. The first height H1 and the length L of the power module 4 are also predetermined according to sizes of the allowable spaces of the electronic devices.

In this embodiment, two power modules 4 in a stack up arrangement are accommodated within the first compartment 21 of the first electronic device 2 in a hot-swappable manner. The two power modules 4 in a side-by-side arrangement are accommodated within the second compartment 31 of the second electronic device 3 in a hot-swappable manner. Since the width of the power module 4 is adaptively determined according to the sizes of the various electronic devices and standardized across a plurality of electronic devices, the maximum number of power modules 4 may be installed in an identical electronic device or different electronic devices. Consequently, the space utilization will be enhanced, and the designing and fabricating cost will be reduced.

In accordance with the present invention, the specified number is one, two, three, four, five or six. Furthermore, the specified number of power modules 4 accommodated within the first compartment 21 and the specified number of power modules 4 accommodated within the second compartment 31 may be identical or different. In an embodiment, two power modules 4 (e.g. 1+1 redundancy configuration), four power modules 4 (e.g. 3+1 redundancy configuration or 2+2 redundancy configuration) or six power modules 4 (e.g. 5+1 redundancy configuration) are accommodated within the first compartment 21 of the first electronic device 2 or the second compartment 31 of the second electronic device 3 of the power supply apparatus 1. Alternatively, one power module 4, three power modules 4 (e.g. 2+1 redundancy configuration) or five power modules 4 (e.g. 4+1 redundancy configuration) are accommodated within the first compartment 21 of the first electronic device 2 or the second compartment 31 of the second electronic device 3 of the power supply apparatus 1.

Figure 2:
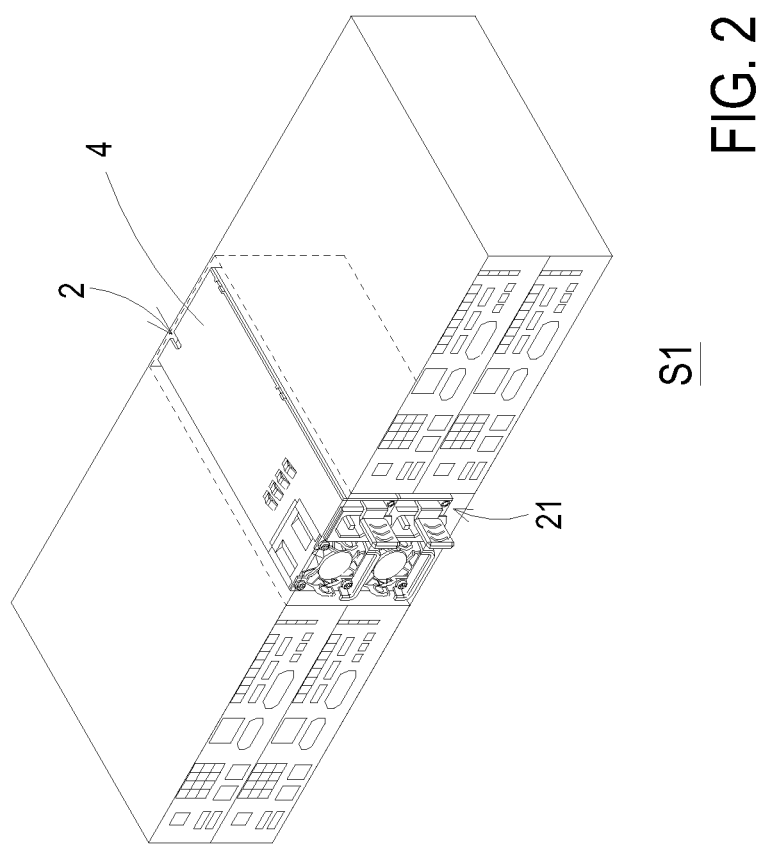
FIG. 2 schematically illustrates two power modules installed in the first electronic device.
Figure 3:
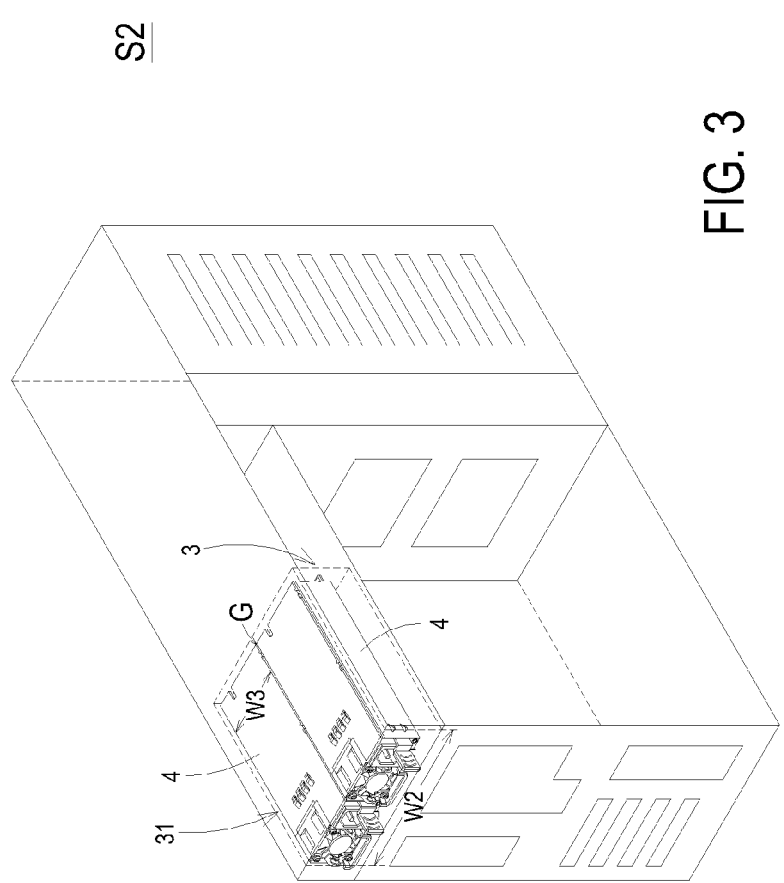
FIG. 3 schematically illustrates two power modules installed in the second electronic device.

FIG. 2 schematically illustrates two power modules installed in the first electronic device. FIG. 3 schematically illustrates two power modules installed in the second electronic device. The power modules 4 are modularized to be installed in the first electronic device 2 and the second electronic device 3. In this embodiment, the first electronic device 2 is applied to a standard 2U server S1, and the second electronic device 3 is applied to a standard tower server S2. The first compartment 21 of the first electronic device 2 and the second compartment 31 of the second electronic device 3 have respective dimensions. The power modules 4 are accommodated within the first compartment 21 of the first electronic device 2 and the second compartment 31 of the second electronic device 3 in different arrangements or different stack forms. From the above discussions, the power module 4 is a standardized power module with an optimal size of the third width W3, the power module 4 can be used as a universal and hot-swappable power module for various electronic devices. Moreover, since the power modules 4 have identical appearance and structural features, the size and the specification of the power modules 4 can be unified, the product development cycle can be shortened and the power modules can be flexibly expanded and highly scalable.

Please refer to FIGS. 1 and 3 again. Two power modules 4 are arranged side-by-side and installed in the second electronic device 3. That is, the two power modules 4 in a side-by-side arrangement are accommodated within the second compartment 31 of the second electronic device 3. For example, the second width W2 of the second compartment 31 of the second electronic device 3 is 150 mm. There is a gap width G between these two power modules 4. For example, the gap width G is about 3 mm. The third width W3 of the power module 4 is about 73.5 mm. The overall width of the two power modules 4 and the gap width G is 150 mm. That is, the overall width is equal to the second width W2 of the second compartment 31 of the second electronic device 3. Consequently, the space utilization is effectively enhanced. In this embodiment, the third width W3 of the power module 4 may be standardized as the optimal width. Furthermore, the first height H1 of the power module 4 may be standardized as the optimal height. For example, the first height H1 is in the range between 39 nm and 40 mm. Preferably, the first height H1 is 39 mm or 40 mm. Furthermore, the length L of the of the power module 4 may be standardized as the optimal length. The length L is perpendicular to the first height H1 and the third width W3. For example, the length L of the power module 4 is 185 mm.

Figure 4:
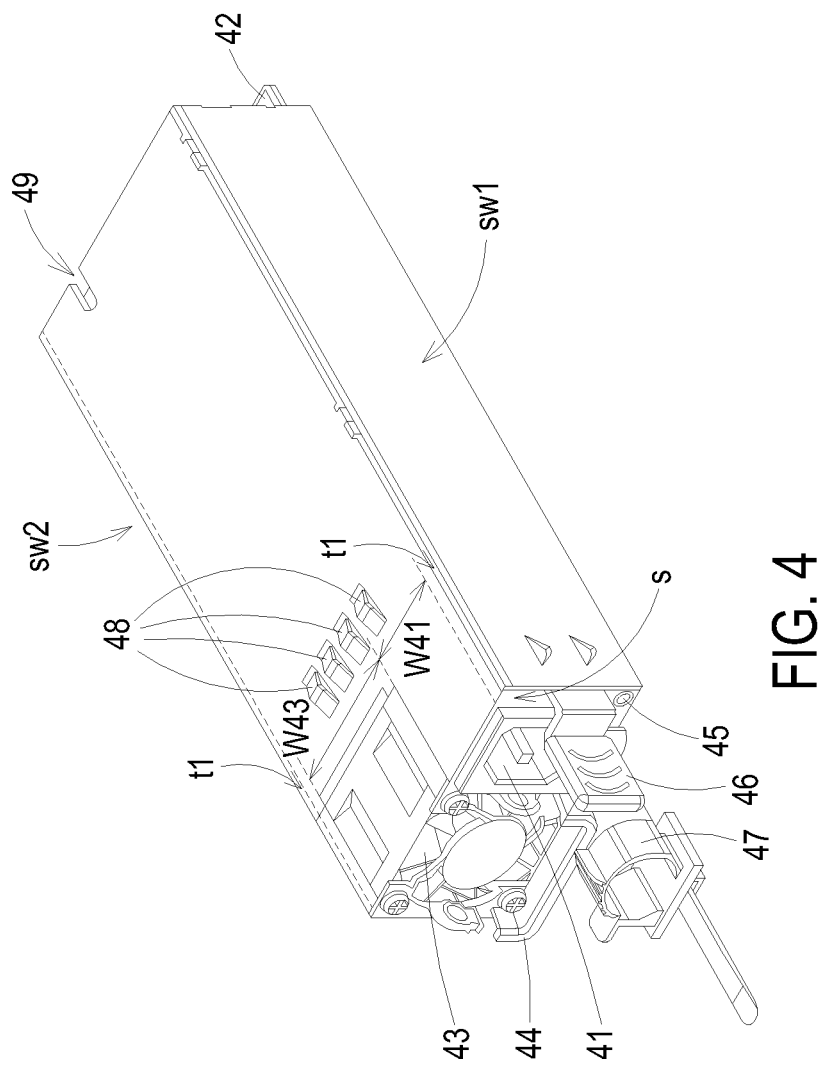
FIG. 4 is a schematic perspective view illustrating the structure of a power module used in the power supply apparatus of the present invention.

FIG. 4 is a schematic perspective view illustrating the structure of a power module used in the power supply apparatus of the present invention. Please refer to FIGS. 3 and 4. Each power module 4 comprises an electric connector 41 and a cooling element 43. The electric connector 41 and the cooling element 43 are embedded in a first surface s of the power module 4. The first surface s is perpendicular to a first sidewall sw1 and a second sidewall sw2 of the power module 4. The electric connector 41 has a width W41, and the cooling element 43 has a width W43. The first sidewall sw1 and the second sidewall sw2 have the same thickness t1. In some embodiments, the third width W3 of the power module 4 is greater than or equal to the sum of the width W43 of the cooling element 43, the width W41 of the electric connector 41, the thickness t1 of the first sidewall sw1, the thickness t1 of the second sidewall sw2, the overall gap width of adjacent components and the assembling tolerance. That is, the optimal width of the third width W3 complies with the formula: W3≥(W41+W43+t1+t1+overall gap width+assembling tolerance).

Please refer to FIGS. 1 and 4. The electric connector 41 of the power module 4 is a power socket for receiving the input voltage. Moreover, the power module 4 further comprises a card-edge connector 42 for transmitting power and signals. The card-edge connector 42 matches a first mating connector 221 of a first power distribution board 22 of the first electronic device 2 and a second mating connector 321 of a second power distribution board 32 of the second electronic device 3. After the card-edge connector 42 is connected with the first mating connector 221 or the second mating connector 321, the functions of outputting the power and controlling signals are achieved. Moreover, the number and locations of the pins may be effectively allocated in order to achieve the purpose of the power supply unit. In some embodiments, the power module 4 may be compatible to different kinds of output watts and input voltages. In a case that the power modules 4 are installed in a large server computer system, the power modules may be arranged in various configurations. For example, the power modules 4 can be arranged in an N+1 redundancy configuration, but it is not limited thereto.

In some embodiments, the cooling element 43 of the power module 4 is a fan. The cooling element 43 is located beside the electric connector 41 for removing heat. Moreover, the cooling element 43 may be fixed on the power module 4 through metallic screws, plastic rivets or rubbery rivets in order to avoid generation of a resonance effect. Moreover, the cooling element 43 is fixed on the power module 4 after a stimulation modal test is done. In some embodiments, the power module 4 further comprises a metallic handle 44 for facilitating installing the first electronic device 2 or the second electronic device 3 in a hot-swappable manner. The metallic handle 44 is covered by a plastic shell (not shown). The color of the plastic shell may be selected according to the color of the power supply apparatus 1. Since the plastic shell is made of an insulating material, the possibility of getting injury from the high temperature of the metallic material will be minimized. Moreover, the metallic handle 44 is rotatable in order to facilitate the airflow to pass through.

Furthermore, the power module 4 may further comprises a LED indicator 45 and a locking element 46, which are located beside the electric connector 41. The LED indicator 45 can emit light of two or more colors to indicate the operating statuses of the power module 4. The locking element 46 is used for fixing the power module 4 within the electronic device. Once an electric plug (not shown) is connected with the electric connector 41, the locking element 46 is hindered by the electric plug from being rotated in order to prevent detachment of the power module 4.

For enhancing safety and stability, the power module 4 further comprises a fastening ring 47 and plural metallic elastic sheets 48. The fastening ring 47 has a protrusion structure (not shown) inserted into a retaining hole (not shown) under the electric connector 41 for preventing detachment of the power cable (not shown). The metallic elastic sheets 48 are disposed on two opposite sides of the power module 4 for minimizing the influence of electromagnetic interference, thereby enhancing the power stability.

Figure 5:
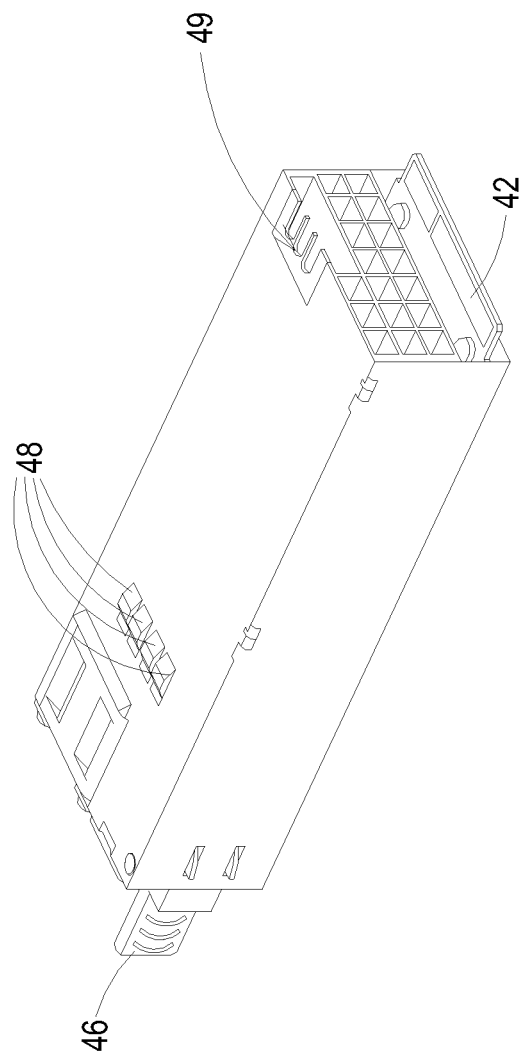
FIG. 5 is a schematic perspective view illustrating the structure of the power module of FIG. 4 and taken along another viewpoint.
Figure 6A:
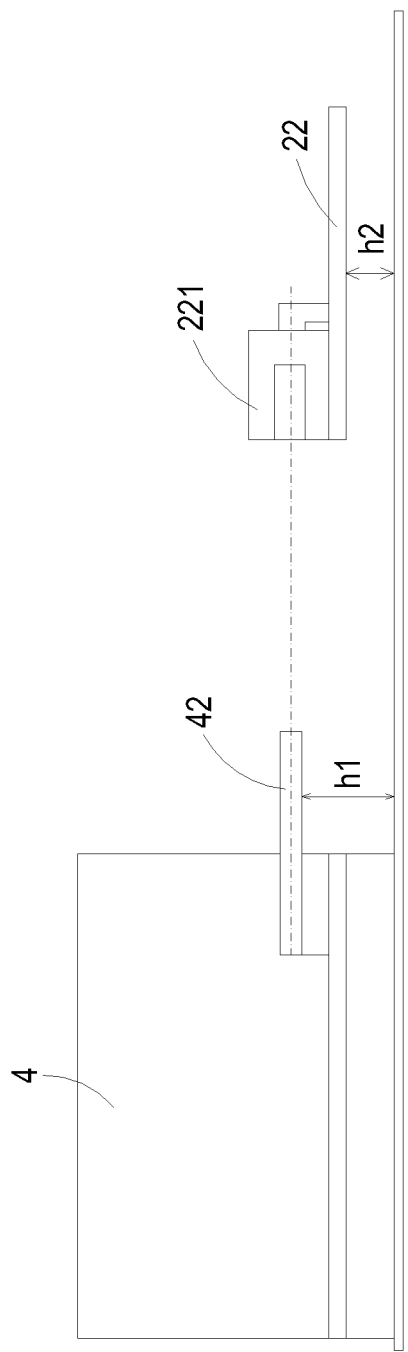
FIG. 6A schematically illustrates the connection between the power module and the first electronic device.
Figure 6B:
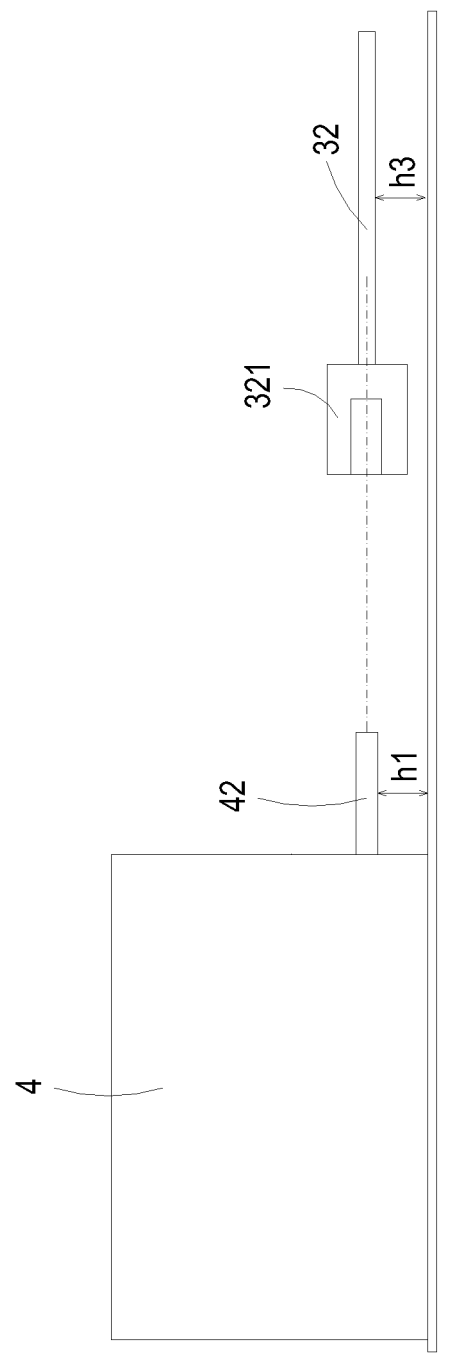
FIG. 6B schematically illustrates the connection between the power module and the second electronic device.

FIG. 5 is a schematic perspective view illustrating the structure of the power module of FIG. 4 and taken along another viewpoint. FIG. 6A schematically illustrates the connection between the power module and the first electronic device. FIG. 6B schematically illustrates the connection between the power module and the second electronic device. Please refer to FIGS. 5, 6A and 6B. The card-edge connector 42 of the power module 4 may be selectively connected with one of the first mating connector 221 of the first power distribution board 22 of the first electronic device 2 and the second mating connector 321 of the second power distribution board 32 of the second electronic device 3. The altitude of the card-edge connector 42 may be adaptively adjusted according to the altitude of the first mating connector 221 of the first power distribution board 22 or the altitude of the second mating connector 321 of the second power distribution board 32. Preferably, the height h1 of the card-edge connector 42 is in the range between 4 mm and 9 mm. Moreover, the power module 4 comprises a positioning recess 49 for assisting in positioning the power module in a foolproof manner and facilitating installing the power module 4.

Figure 7:
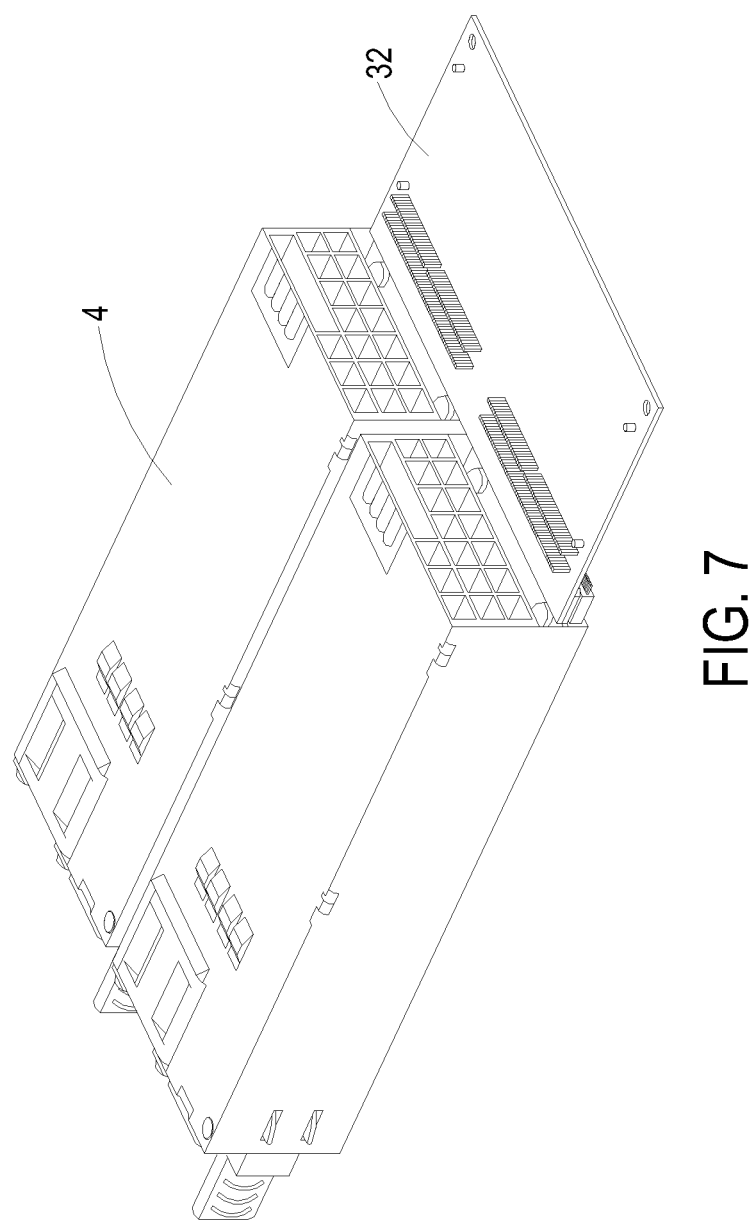
FIG. 7 schematically illustrates the relationship between the power module and the power distribution board of the electronic device according to an embodiment of the present invention.

FIG. 7 schematically illustrates the relationship between the power module and the power distribution board of the electronic device according to an embodiment of the present invention. Please refer to FIGS. 1 and 7. For allowing the power modules 4 to be connected with the first power distribution board 22 of the first electronic device 2 or the second mating connector 321 of the second power distribution board 32 of the second electronic device 3, the input terminals of the first power distribution board 22 and the second power distribution board 32 are dependent on the number of the power modules 4. Moreover, according to the practical requirements, vertical terminals or horizontal terminals may be selectively used. Consequently, the electric energy may be transmitted from the first power distribution board 22 or the second power distribution board 32 to the system circuit board and the internal components of the electronic equipment (not shown in FIGS. 1 and 7) through a corresponding wire. In an embodiment, the power module 4 is configured to blind mate with a system circuit board of the electronic equipment directly so that a specified number of the power modules 4 are permitted to be accommodated within the electronic equipment (not shown in FIGS. 1 and 7).

Figure 8:
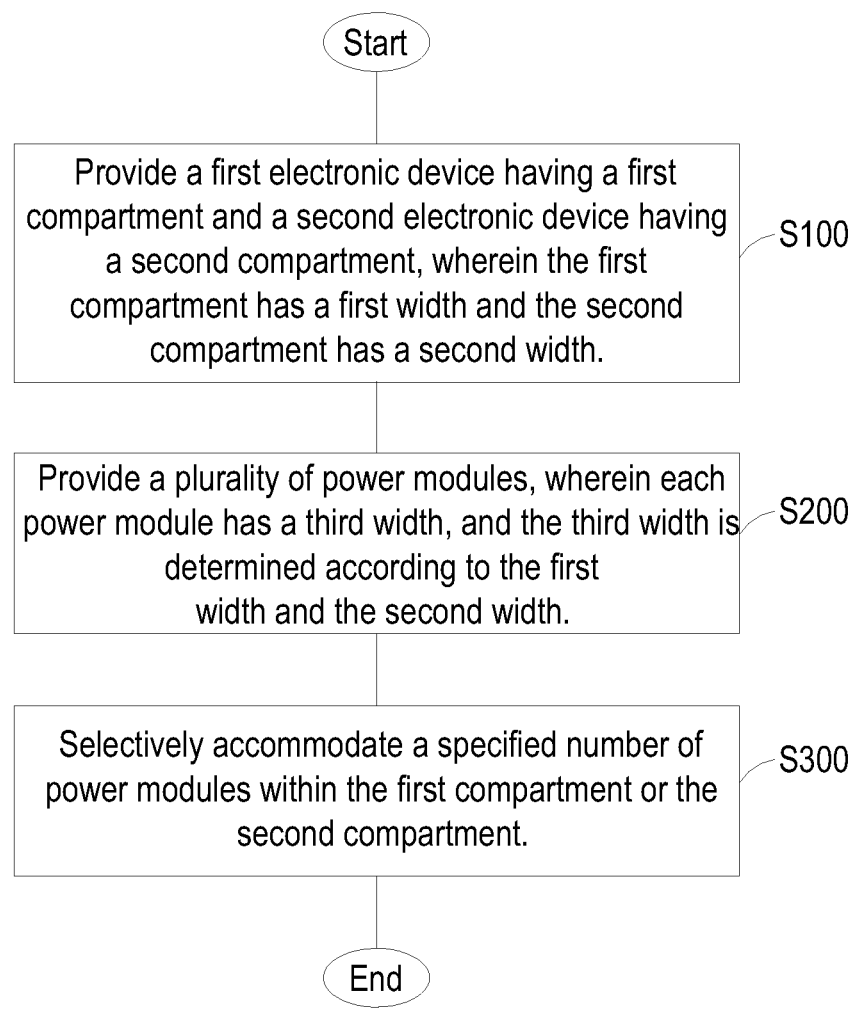
FIG. 8 is a flowchart illustrating a modular power connecting method according to an embodiment of the present invention.

FIG. 8 is a flowchart illustrating a modular power connecting method according to an embodiment of the present invention. Please refer to FIGS. 1 and 8. The modular power connecting method comprises the following steps. Firstly, in the step S100, a first electronic device 2 and a second electronic device 3 are provided. The first electronic device 2 comprises a first compartment 21, and the second electronic device 3 comprises a second compartment 31. The first compartment 21 has a first width W1, and the second compartment 31 has a second width W2. Then, in the step S200, plural power modules 4 are provided. Each power module 4 has a third width W3. The third width W3 is determined according to the first width W1 and the second width W2. Afterwards, in the step S300, a specified number of power modules 4 are selectively accommodated within the first compartment 21 or the second compartment 31.

Please refer to FIGS. 1, 3, 4 and 8. In the step S200, the third width W3 is determined according to the first width W1 of the first compartment 21 of the first electronic device 2 and the second width W2 of the second compartment 31 of the second electronic device 3. In accordance with the present invention, the minimum value of the third width W3 is permitted to accommodate the cooling element 43 and the electric connector 41. Moreover, the sum of the thickness t1 of the first sidewall sw1, the thickness t1 of the second sidewall sw2, the overall gap width of adjacent components and the assembling tolerance should be greater than or equal to 69 mm. That is, the third width W3 of the power module 4 is greater than or equal to 69 mm. For allowing the maximum number of power modules to be installed in an identical electronic device or different electronic devices, a first integral multiple m of the third width W3 is smaller or equal to the first width W1 and a second integral multiple n of the third width W3 is smaller or equal to the second width W2. That is, m×W3≤W1, and n×W3≤W2. Moreover, when the gap width G between every two adjacent power modules 4 is taken into consideration, the sum of m multiple of the third width W3 and (m−1) multiple of the gap width G is smaller than or equal to the first width W1, and the sum of n multiple of the third width W3 and (n−1) multiple of the gap width G is smaller than or equal to the second width W2. That is, the m×W3+G×(m−1)≤W1, and n×W3+G×(n−1)≤W2.

In some embodiments, the gap width G is at least 3 mm. Moreover, the allowable width of the first electronic device 2 or the second electronic device 3 that uses the power modules 4 with output power of 460 watts, 800 watts, 1200 watts, 1600 watts and 2000 watts should be taken into consideration. That is, each of the first width W1 of the first electronic device 2 and the second width W2 of the second electronic device 3 is 106 mm (EPS1U), 108 mm (EPS2U), 150 mm (ERP2U), 123.5 mm (DPS48V) or 450 mm (SSI 19" Rack cabinet). According to a mathematical model, the optimal width is obtained. Based on the intersection, the calculation results show that the optimal third width W3 is about 73.5 mm, the gap width between every two adjacent power modules 4 is about 3 mm, and the specified number is one, two, three, four, five or six. Under this circumstance, the maximum number of power modules 4 may be installed in an identical electronic device or different electronic devices. Consequently, the space utilization will be enhanced, and the designing and fabricating cost will be reduced.

A method of obtaining the optimal third width W3 will be illustrated in more details as follows.

In the limiting condition (a), the minimum third width W3 is obtained. That is, W3≥(2×0.8 mm)+40 mm+24 mm+3.4 mm=69 mm. In this formula, the item (2×0.8 mm) denotes the sum of the thickness t1 of the first sidewall sw1 and the thickness t1 of the second sidewall sw2; the item 40 mm denotes the width W43 of the cooling element 43; the item 24 mm denotes the width W41 of the electric connector 41; and the item 3.4 mm denotes the overall gap width of adjacent components and the assembling tolerance.

In the limiting condition (b), the maximum third width W3 is obtained. That is, W3×1+G×(1−1)=W3≤106 mm.

In the limiting condition (c), the maximum third width W3 is obtained. That is, W3×1+G×(1−1)=W3≤108 mm.

In the limiting condition (d), the maximum third width W3 is obtained. That is, W3×2+G×(2−1)=W3×2+3 mm≤150 mm. Consequently, W3≤147 mm÷2=73.5 mm.

In the limiting condition (e), the maximum third width W3 is obtained. That is, W3×1+G×(1−1)=W3≤123.5 mm.

In the limiting condition (f), the maximum third width W3 is obtained. That is, W3×5+G×(5−1)=W3×5+12 mm≤450 mm. Consequently, W3≤438 mm÷5=87.6 mm.

Furthermore, if more power modules 4 are employed, the outer size of the electronic device should be taken into consideration in order to comply with the internal space limitation of the rack cabinet. In this embodiment, the optimal third width W3 of the power module 4 is 73.5 mm, the assembling tolerance of two adjacent power modules is 0.5 mm, the gap width G is 3 mm, and the minimum thickness t2 of the sidewall of the electronic device is 0.8 mm. In a case that plural power modules 4 in a stack up arrangement are installed in the electronic device 2, the minimum width CW of the electronic device 2 is about 75.6 mm. In addition, q power modules in a side-by-side arrangement are installed in the electronic device. According to a mathematical model, the minimum width CW of the electronic device may be obtained. In a case that two power modules 4 in a side-by-side arrangement are installed in the electronic device 3, the minimum width CW of the electronic device 3 is about 152.6 mm. In a case that three power modules 4 in a side-by-side arrangement are installed in the electronic device 3, the minimum width CW of the electronic device 3 is about 229.6 mm. In a case that four power modules 4 in a side-by-side arrangement are installed in the electronic device 3, the minimum width CW of the electronic device 3 is about 306.6 mm. In a case that five power modules 4 in a side-by-side arrangement are installed in the electronic device 3, the minimum width CW of the electronic device 3 is about 383.6 mm. In a case that six power modules 4 in a side-by-side arrangement are installed in the electronic device 3, the minimum width CW of the electronic device 3 is about 460.6 mm.

The above data are obtained according to the formula: the minimum CW value=(W3+0.5)×q+G×(q−1)+t2×2.

In a case that plural power modules 4 are in a stack up arrangement, the minimum value of the first width W1=W3+0.5=74 mm. For the electronic device 2, the minimum width CW=W1+0.8×2=75.6 mm. In a case that two power modules 4 are in a side-by-side arrangement (q=2), the minimum value of the second width W2=(W3+0.5)×2+3=151 mm. For the electronic device 3, the minimum width CW=W2+0.8×2=152.6 mm. In a case that three power modules 4 are in a side-by-side arrangement (q=3), the minimum value of the second width W2=(W3+0.5)×3+3×2=228 mm. For the electronic device 3, the minimum width CW=W2+0.8×2=229.6 mm. In a case that four power modules 4 are in a side-by-side arrangement (q=4), the minimum value of the second width W2=(W3+0.5)×4+3×3=305 mm. For the electronic device 3, the minimum width CW=W2+0.8×2=306.6 mm. In a case that five power modules 4 are in a side-by-side arrangement (q=5), the minimum value of the second width W2=(W3+0.5)×5+3×4=382 mm. For the electronic device 3, the minimum width CW=W2+0.8×2=383.6 mm. In a case that six power modules 4 are in a side-by-side arrangement (q=6), the minimum value of the second width W2=(W3+0.5)×6+3×5=459 mm. For the electronic device 3, the minimum width CW=W2+0.8×2=460.6 mm. Similarly, if more than six power modules 4 are in a side-by-side arrangement (q>6), the rest may be deduced by analogy.

Figure 9:
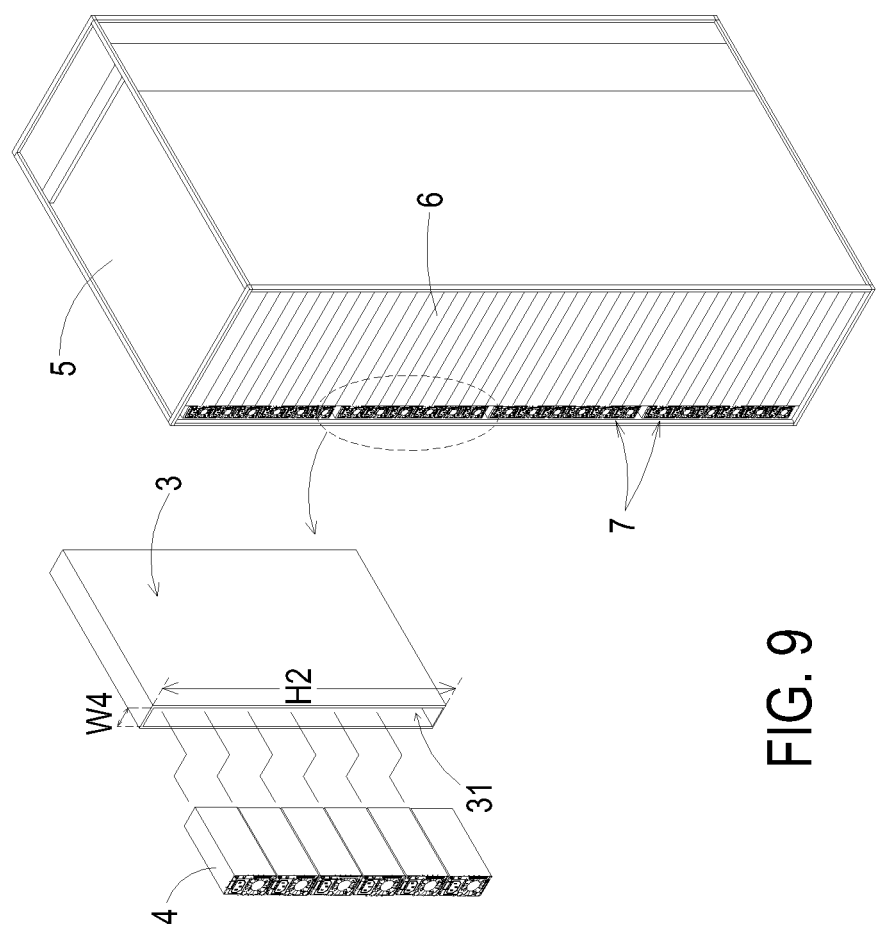
FIG. 9 schematically illustrates multiple power modules installed in the second electronic device according to another embodiment of the present invention.

According to the above analyzing results, another power supply apparatus will be illustrated with reference to FIG. 9. FIG. 9 schematically illustrates multiple power modules installed in the second electronic device 3 according to another embodiment of the present invention. Please refer to FIGS. 1 and 9. If the second electronic device 3 is rotated by 90 degrees, the second electronic device 3 is upright. Meanwhile, the width of the second compartment 31 is equal to a fourth width W4. In accordance with the present invention, the fourth width W4 is smaller than or equal to 40.5 mm. Under this circumstance, the second electronic device 3 may be installed in a lateral space or a rear space of a rack cabinet 5 in a zero-U vertical arrangement. In a practical application example of the zero-U vertical arrangement, a 42U-height standard rack cabinet 5 conforming to the EIA-310 (Electronic Industries Alliance) specifications may be employed. The rack cabinet 5 has a 19-in rack-mount electronic equipment 6 (e.g. a network server or a network switch). Moreover, as shown in FIG. 9, the second electronic device 3 has a second height H2, which is equal to the original minimum width CW of the second electronic device 3. Since the third width W3 of the power module 4 is about 73.5 mm, if six power modules 4 are used, the second height H2 of the second electronic device 3 is about 460.6 mm according to the above analyzing results. Since the second height H2 is smaller than or equal to 466 mm, it is found that at most six power modules 4 may be accommodated within the rack cabinet 5. From the above discussions, the second electronic device 3 may be selectively in a horizontal 1U arrangement or a zero-U vertical arrangement to meet the user's requirements according to the optimal dimension of the third width W3 and the first height H1. Consequently, the space utilization of the rack cabinet is enhanced. For the 42U-height standard rack cabinet 5, four sets of power supply apparatuses 7 in a 5+1 redundancy configuration may be assembled for super power. That is, at most twenty four power modules 4 can be simultaneously accommodated within the rack cabinet 5.

From the above description, the present invention provides a universal power supply apparatus and a power connecting method thereof. The form factor of the power module can be determined according to the sizes of the compartments of various electronic devices. In such way, a maximum number of power modules may be installed in an identical electronic device or different electronic devices. Consequently, the space utilization will be enhanced, and the designing and fabricating cost will be reduced. Moreover, since the power modules are standardized across a plurality of different electronic devices and the size and the specification of the power modules are unified, the product development cycle can be shortened and the power modules can be flexibly expanded and highly scalable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A power supply apparatus, comprising:
   a first electronic device comprising a first compartment, wherein said first compartment has a first width;
   a second electronic device comprising a second compartment, wherein said second compartment has a second width; and
   a plurality of power modules, wherein each of said power modules has a third width, wherein said third width is determined according to said first width and said second width, and wherein a first integral multiple of said third width is smaller or equal to said first width, and a second integral multiple of said third width is smaller or equal to said second width, so that a specified number of said power modules are selectively accommodated within said first compartment or said second compartment.

2. The power supply apparatus according to claim 1, wherein said specified number is one, two, three, four, five or six.

3. The power supply apparatus according to claim 1, wherein each of said power modules comprises an electric connector and a cooling element, said electric connector and said cooling element are embedded in a first surface of said power module, and first surface is perpendicular to a first sidewall and a second sidewall of said power module, and wherein said third width is greater than or equal to the sum of a width of said cooling element, a width of said electric connector, a thickness of said first sidewall, a thickness of said second sidewall, an overall gap width of adjacent components and an assembling tolerance.

4. The power supply apparatus according to claim 3, wherein said electric connector is a power socket, and said cooling element is a fan.

5. The power supply apparatus according to claim 1, wherein the sum of m multiple of said third width and (m−1) multiple of a gap width between every two adjacent power modules is smaller than or equal to said first width, and the sum of n multiple of said third width and (n−1) multiple of said gap width between every two adjacent power modules is smaller than or equal to said second width, wherein m is said first integral multiple, and n is said second integral multiple.

6. The power supply apparatus according to claim 5, wherein each of said first integral multiple and said second integral multiple is one, two, three, four, five or six.

7. The power supply apparatus according to claim 1, wherein said first width is 74 mm, and said second width is 151 mm, 228 mm, 305 mm, 382 mm or 459 mm.

8. The power supply apparatus according to claim 1, wherein said specified number of power modules are accommodated within said first compartment of said first electronic device or said second compartment of said second electronic device in a hot-swappable manner.

9. The power supply apparatus according to claim 1, wherein said third width of each power module is greater than 69 mm.

10. The power supply apparatus according to claim 1, wherein said third width of each power module is about 73.5 mm.

11. The power supply apparatus according to claim 1, wherein said specified number of power modules are accommodated within said first compartment or said second compartment in a stack up arrangement or a side-by-side arrangement.

12. The power supply apparatus according to claim 1, wherein each of said first electronic device and said second electronic device is installed in one of a desktop computer, a large-scale supercomputer, a data processing system, a network server, a data storage system, a router and a network switch.

13. The power supply apparatus according to claim 1, wherein said power modules are power supply units.

14. The power supply apparatus according to claim 1, wherein each power module has a height in a range between 39 mm and 40 mm, and each power module has a length of about 185 mm.

15. A modular power connecting method, comprising steps of:
- providing a first electronic device and a second electronic device, wherein said first electronic device comprises a first compartment, and said second electronic device comprises a second compartment, wherein said first compartment has a first width, and said second compartment has a second width;
- proving a plurality of power modules, wherein each power module has a third width, and said third width is determined according to said first width and said second width, and wherein a first integral multiple of said third width is smaller or equal to said first width, and a second integral multiple of said third width is smaller or equal to said second width; and
- selectively accommodating a specified number of power modules within said first compartment or said second compartment.

16. The modular power connecting method according to claim 15, wherein said third width of each power module is about 73.5 mm.

17. A power supply apparatus, comprising:
- an electronic device; and
- at least one power module having a modularized width, wherein said modularized width is determined according to said electronic device and other electronic devices, and wherein a first integral multiple of said modularized width is smaller or equal to a first width of a first compartment of said other electronic devices, and a second integral multiple of said modularized width is smaller or equal to a second width of a second compartment of said electronic device, so that a specified number of power modules are permitted to be accommodated within said electronic device.

18. The power supply apparatus according to claim 17, wherein said modularized width is about 73.5 mm, and said power module has a height of 39~40 mm and a length of about 185 mm.

19. The power supply apparatus according to claim 17, wherein said electronic device comprises a power distribution board, and said power distribution board comprises a mating connector, wherein said power module has a card-edge connector matching said mating connector of said power distribution board.

* * * * *